United States Patent
Nietfeld et al.

(10) Patent No.: US 8,619,953 B2
(45) Date of Patent: *Dec. 31, 2013

(54) HOME VIDEOCONFERENCING SYSTEM

(75) Inventors: Paul G. Nietfeld, Austin, TX (US);
Krishna Sai, Austin, TX (US); Edward W. Brakus, Jr., Austin, TX (US);
Edward Gonen, Yoqneam Illit (IL);
Shai Toren, Tivon (IL); Boris Rakhlin, Haifa (IL)

(73) Assignee: Polycom, Inc., San Jose, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/986,088

(22) Filed: Jan. 6, 2011
(Under 37 CFR 1.47)

(65) Prior Publication Data
US 2012/0169831 A1   Jul. 5, 2012

Related U.S. Application Data

(63) Continuation-in-part of application No. 11/308,294, filed on Mar. 15, 2006, now Pat. No. 7,884,844.

(60) Provisional application No. 61/292,720, filed on Jan. 6, 2010.

(51) Int. Cl.
*H04M 11/00* (2006.01)

(52) U.S. Cl.
USPC ..................... 379/93.21; 348/14.04

(58) Field of Classification Search
USPC ............. 348/14.01, 14.04, 14.12, 14.13;
379/93.21, 158, 202.01, 204.01
See application file for complete search history.

(56) References Cited

U.S. PATENT DOCUMENTS

| | | | |
|---|---|---|---|
| 6,339,842 B1 | 1/2002 | Fernandez et al. | |
| 6,452,923 B1 | 9/2002 | Gerzberg et al. | |
| 6,889,385 B1 | 5/2005 | Rakib et al. | |
| 7,325,033 B2 * | 1/2008 | Thornton | 709/204 |
| 7,389,103 B2 * | 6/2008 | Stepanian | 455/344 |
| 2005/0091380 A1 | 4/2005 | Gonen et al. | |
| 2006/0020993 A1 * | 1/2006 | Hannum et al. | 725/111 |

OTHER PUBLICATIONS

"Skype—The Big Blog—Get Skype on your TV," obtained from http://blogs.skype.com/, generated Dec. 30, 2010, first post dated Jan. 5, 2010.
"Skype—The Big Blog—Get Skype on your TV: Samsung joins the team," obtained from http://blogs.skype.com/, generated Dec. 30, 2010, first post dated Feb. 25, 2010.
"Skype—The Big Blog—Get Skype on your TV archive," obtained from http://blogs.skype.com/, generated Dec. 30, 2010.
Taves, Scott, "Full Stream ahead for some HDTV's," obtained from http://www.msnbc.msn.com/, generated Jan. 6, 2011, updated Sep. 14, 2009.

* cited by examiner

*Primary Examiner* — Olisa Anwah
(74) *Attorney, Agent, or Firm* — Wong, Cabello, Lutsch, Rutherford & Brucculeri, LLP

(57) ABSTRACT

A home videoconferencing system interfaces with traditional set-top boxes and typical home A/V equipment. The system includes a camera, a microphone, and a codec module. The module can couple to a modem connected to a television network and can couple to a display and a set-top box. Alternatively, the module can connect to a network for exchanging videoconference data and can connect between the set-top box and the display. The set-top box can connect to the television network on its own.

39 Claims, 6 Drawing Sheets

HOME VIDEOCONFERENCING SYSTEM

CROSS-REFERENCE TO RELATED APPLICATIONS

This application is a continuation-in-part of U.S. patent application Ser. No. 11/308,294, filed Mar. 15, 2006 and claims the benefit of U.S. Provisional Appl. Ser. No. 61/292,720, filed Jan. 6, 2010 and entitled "Home Videoconferencing System," which are both incorporated herein by reference in their entireties and to which priority is claimed.

FIELD OF THE DISCLOSURE

The subject matter of the present disclosure relates to a videoconferencing system for conducting a videoconferencing session over a television network by adding videoconferencing capability to in-home TV/set-top box environments in a manner that supports seamless integration of the videoconferencing functions into the home audio/video environment.

BACKGROUND OF THE DISCLOSURE

Videoconferencing allows participants to share audio and video during a videoconference session. Existing videoconferencing systems can be grouped into two primary categories. A first category includes dedicated systems designed for enterprise conference rooms or personal offices, while a second category includes PC-based systems designed for personal use.

To conduct a videoconference session, the participants must have multimedia endpoints, which are typically associated with computers and are connected to a wideband network. Operating such multimedia endpoints and establishing the videoconferencing session requires that the participants have a certain amount of knowledge on how to set up the endpoints, connect the endpoints, etc. Because of limitations inherent in the design of either type of system, both types have connectivity, ease-of-use, and end-user feature set issues that have prevented the widespread adoption of such systems for use in the home environment. Consequently, videoconferencing sessions are popular in business environments where participants typically have more expertise, but videoconferencing sessions have not been popular between private households.

Advances in digital broadcasting enable television providers to offer interactive services, such as video-on-demand, to subscribers. Conventional interactive television systems, however, are limited to unidirectional video communication and/or audio telephony, and do not support video telephony. For example, some television systems enable television subscribers to access and view World Wide Web pages on their televisions in addition to receiving television channels. Although access to the web is possible, other "computer-like" functions are not currently available to television subscribers.

Thus, what is needed in the art is a videoconferencing system for home use that can integrate with typical existing home video equipment (such as televisions, cable or satellite set-top boxes, etc.) and provide natural transitions between content viewing and video calls, connectivity to existing videoconferencing systems for home office applications, high-quality audio and video experience, and expansion capabilities for feature enhancements. It is desirable for the system to be easy to install and use so as to appeal to a wide audience and provides a natural interactive experience in video calls.

SUMMARY OF THE DISCLOSURE

In one embodiment, a home videoconferencing (HVC) system includes a camera, a microphone, and a codec or interface module. The codec module couples to a modem, a television display, and a set-top box, and the modem connects to a television network. The codec module decodes encoded audio and video signals received from the modem that are part of a videoconferencing session. The codec module also encodes audio and video signals received from the camera and the microphone and sends the encoded audio video signals to the modem to be part of the videoconferencing session.

Depending on its mode of operation, the codec module can selectively send decoded audio signals to the television display or can selectively send video received from the set-top box to the television display. In addition, the codec module can send compressed audio and video signals received from the microphone and camera to the set-top box for processing and delivery to the television display.

In one embodiment, the camera can be a compression video camera, such as a VIAVIDEO II™ camera from POLYCOM™, and the camera captures and compresses video for a videoconferencing session. Circuitry associated with the microphone performs audio compression and decompression so that acoustic echo cancellation can be performed. The compressed audio and video signals are transmitted to the interface module, which encodes them and sends them over the television network via the modem as part of the videoconferencing session. Encoded audio and video received over the television network via the modem are received by the interface module as part of the videoconferencing session. These received audio and video signals can be delivered to the television after processing and decoding by the television set-top box or by the interface module.

The disclosed HVC system allows a user to conduct bi-directional communication as part of a videoconferencing session using the network. Using the disclosed system, for example, a television subscriber can conduct videoconferencing sessions with other users and can exchange video and/or audio with other users equipped with similar devices. The subscriber can establish the videoconferencing sessions ad-hoc between two or more other users by selectively controlling the system.

Features of the disclosed HVC system can include: (1) simple connections to standard home entertainment components; (2) natural transitions between content viewing and videoconferencing mode ("video calls"); high-quality videoconferencing capabilities, including support for full interoperability with existing standards-based enterprise videoconferencing systems; (3) high-quality audio processing including enhanced acoustic echo cancellation (AEC) technology for natural audio interaction without the need for headsets; and (4) expansion capabilities to support extended features such as wireless IP connectivity, enhanced microphone array, support for a second monitor and/or interconnection with units of other HVC systems within the home, and local data storage for call recording and/or video message recording.

The disclosed HVC system with its interconnect and standalone video datapath and UI capabilities make it compatible with a wide range of set-top boxes and home environment configurations. Therefore, the HVC system can be deployed in conjunction with service providers (i.e., cable or satellite television and/or internet service providers) and can preferably perform all functions without changes to the set-top box or other network interface.

The foregoing summary is not intended to summarize or limit each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
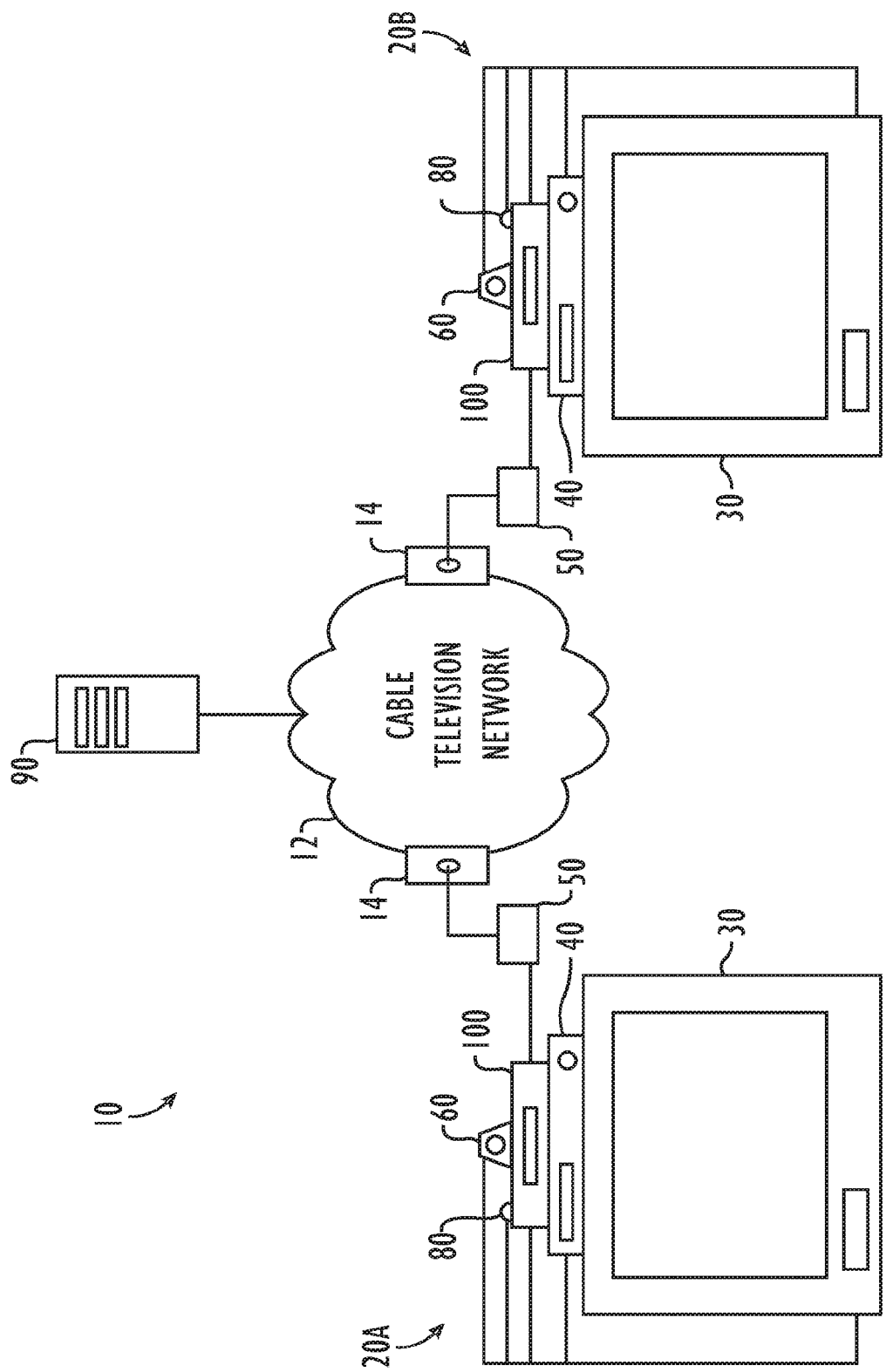
FIG. 1 illustrates an embodiment of a videoconferencing setup for a television network according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring to FIG. 1, a videoconferencing setup 10 for a television network 12 is illustrated. In one embodiment, the television network 12 is a digital cable television network. The videoconferencing setup 10 is shown having two home videoconferencing (HVC) systems 20A and 20B for illustrative purposes, although there may be only one or more than two in a given videoconference. Each HVC system 20A and 20B includes a camera module 60, a microphone 80, and a codec or interface module 100. The codec module 100 couples to the camera module 60 and the microphone 80 using conventional connections, such as Universal Serial Bus and audio-in, for example. Alternatively, the camera module 60 and microphone 80 can be integral components of the codec module 100.

The codec module 100 couples a television (TV) set, Audio/Visual equipment, and/or display 30 to the digital television network 12 for conducting videoconferences. The codec module 100 allows the digital television network 12 to be used as a bi-directional network to carry bi-directional Internet Protocol (IP) based communications during a videoconferencing session, for example. To connect with the network 12, the codec module 100 connects to a television socket 14 of the network 12 via a television Internet modem 50, and the codec module 100 connects to the input of the display 30 and/or to a set-top box 40 connected to the display 30. Although shown only connected to the digital television network 12, the codec module 100 can connect to any suitable network in addition to or as an alternative to the digital television network. For example, the codec module 100 can connect to a home IP network using modems, routers, and the like to connect to the Internet or other WAN for communication.

The set-top box 40 can be independently connected to the television network 12 and can be a conventional set-top box known in the art used for televisions. In general, the set-top box 40 disclosed herein can receive program content delivered through traditional radio frequency broadcast, satellite signal, cable television (CATV), and Internet Protocol television (IPTV) formats. For its part, the display 30 may have advanced features and may incorporate components related to the set top box 40 and its capabilities and may have Internet-enabled features as well.

The camera module 60 is preferably capable of producing compressed video signals. Examples of compression cameras include, but are not limited to, a VIAVIDEO™ or VIAVIDEO II™ camera from POLYCOM™. Alternatively, the camera module 60 can be a conventional webcam, in which case any compression can done by a processor associated with the camera module 60 or in the codec module 100.

As will be explained in more detail below, the codec module 100 processes video signals from the camera module 60 and audio signals from the microphone 80. Then, the codec module 100 transmits the processed audio and video signals to the television network 12 as part of a videoconferencing session. In addition, the codec module 100 receives audio and video from the television network 12 as part of a videoconferencing session. Then, the codec module 100 processes the audio and video and sends the processed audio and video as input to the display 30 or to the set-top box 40 depending on the set up used.

Figure 2:
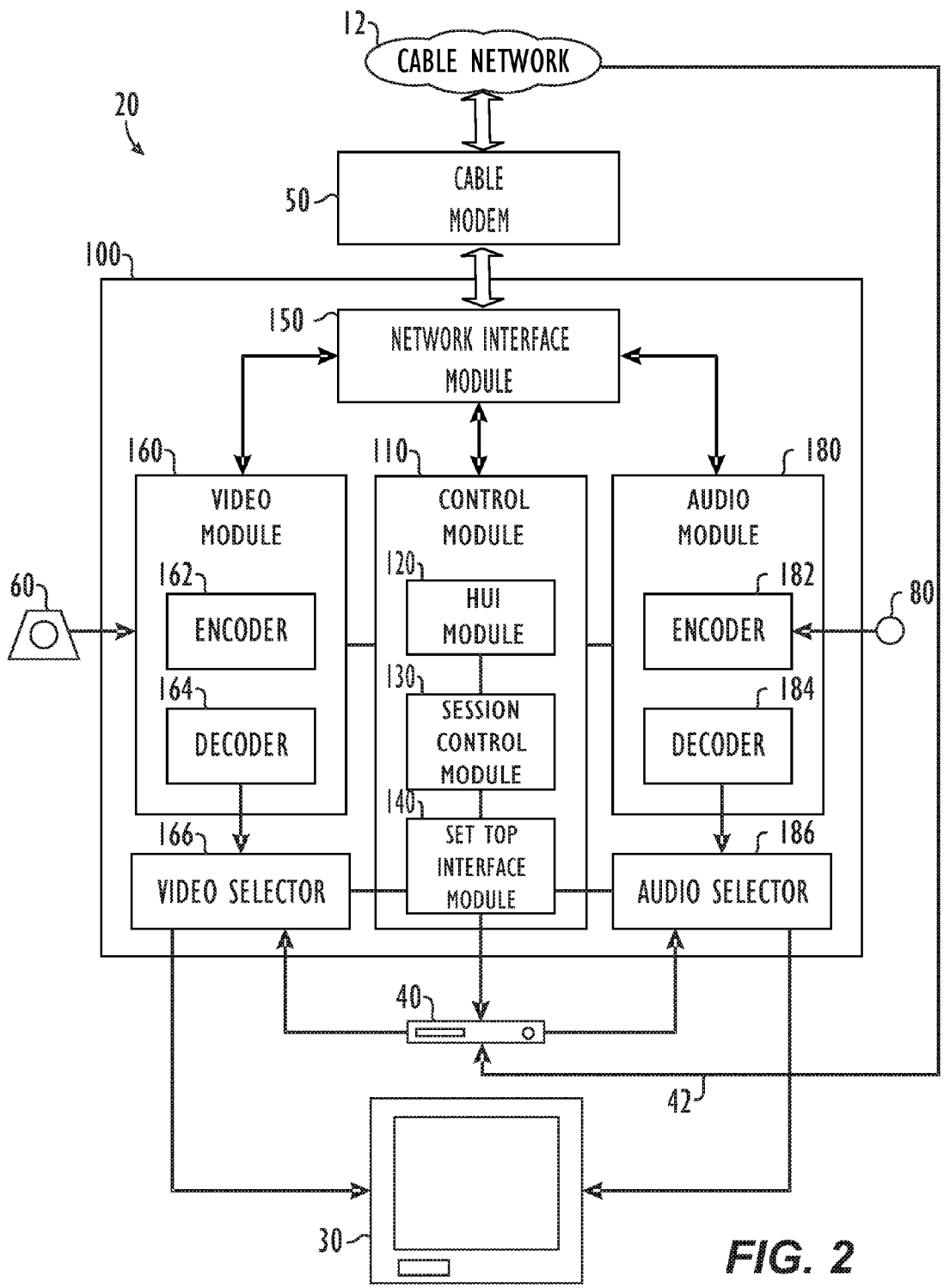
FIG. 2 schematically illustrates an embodiment of a codec module for a home videoconferencing system of the present disclosure.

In one embodiment, the codec module 100 has a network interface, such as module 150 discussed below in FIG. 2, which connects to an intermediate server 90, such as a POLYCOM™ WEB OFFICE™ server. The intermediate server 90 is used to establish a videoconference session between HVC systems 20A and 20B. An exemplary intermediate server is disclosed in U.S. Patent Application Publication 2005/0091380, which is incorporated herein by reference in its entirety. In an alternative embodiment, the codec module 100 has a network interface, such as module 150 discussed below in FIG. 2, that can establish a videoconference session between HVC systems 20A and 20B based on a communication protocol, such as H.323, Session Initiation Protocol (SIP), or Internet Protocol (IP), without using such an intermediate server 90.

Given the overview of the videoconferencing setup 10 discussed above, we now turn to a more detailed discussion of a HVC system 20. Referring to FIG. 2, a home videoconferencing (HVC) system 20 is schematically illustrated in more detail. The codec module 100 of the HVC system 20 includes a control module 110, a network interface module 150, a video module 160, and an audio module 180. The network interface module 150 communicatively couples to the television network 12 via the modem 50. Thus, the network interface module 150 is configured for multimedia communication based on protocols including, but not limited to, H.323, SIP, or any other IP communication protocol. The multimedia communication handled by the network interface module 150 includes compressed video and compressed audio, as well as control and signaling communication for a videoconference. The set-top box 40 couples to the codec module 100 and can have an independent connection 42 to the television network 12.

To handle video, the video module 160 includes a video codec having an encoder 162 and decoder 164. The video module 160 receives compressed video from the network interface module 150 and receives video signals from the camera module 60. The video signals from the camera module 60 can be open video (uncompressed video) or compressed video.

The decoder 164 decodes the compressed video. The decoded video can then be sent via a selector 166 directly to a video input of the display 30 for display when the selector 166 is in a first state as shown in FIG. 2. When the selector 166 is in a second state, however, video from the set-top box 40 can be routed to the display 30. This second state of the selector 166 may be used when the codec module 100 is not being used for videoconferencing and a user wants to view content from the television network 12 on the display 30. Alternatively, this second state of the selector 166 may be used when the codec module 100 sends compressed video signals from the camera module 60 to the set-top box 40 for processing, as discussed below.

In an embodiment of the HVC system 20, the selector 166 can be a video mixer. As a video mixer, the selector 166 can receive decoded video from the set-top box 40 and from the decoder 164. The selector 166 can then build a video frame that includes video coming from the set-top box 40 and video from the videoconference. By using the selector 166 in this manner as a video mixer, two or more people (i.e., "buddies") can see the same TV program while conducting the videoconference.

In an alternative embodiment, the video module 160 can send compressed video to the set-top box 40 on one of the available channels, and the set-top box 40 can then process the compressed video for delivery to the display 30. The delivery can be done through a direct connection between the set-top box 40 and the display 30, or the processed video can be routed from the box 40 to the display 30 via the video selector 166.

In one embodiment, the video selector 166 can be embodied in a physical switch actuated by a user to select routing of video. In an alternative embodiment, the video selector 166 can be embodied in software of the codec module 100 controlled by user selections and commands from the control module 110, and specifically from its Human User Interface module 120. When either switching or mixing video, the selector 166 preferably performs transitions gradually to make seamless transitions between content viewing and video calls.

The video module 162 also receives video from the camera module 60 using conventional interfaces and inputs. Video compression is preferably performed by the camera module 60 so that any bandwidth limitations that may be involved with communicating uncompressed video from the camera module 60 to the codec module 100 can be avoided. The encoder 162 encodes the compressed video from the camera module 60 and sends the encoded video to the television network 12 via network interface module 150 and the modem 50. This sent video can then be viewed as part of the videoconference session by a remote participant having another videoconferencing system. Yet in an alternate embodiment of the HVC system 20, a compressed video signal from the camera module 60 can be transmitted as is from the camera module 60 to the network interface module 150.

To handle audio, the audio module 180 includes an audio codec having an encoder 182 and decoder 184. The audio module 180 receives compressed audio from network interface module 150 and the microphone 80, and the decoder 184 decodes encoded and compressed audio. The decoded audio can then be sent via a selector 186 to an audio input of the display 30 when the selector 186 is in a first state as shown in FIG. 2. When the selector 186 is in a second state, however, audio from the set-top box 40 can be routed to the display 30.

This second state of the selector 186 may be used when the codec module 100 is not being used for videoconferencing and a user wants to hear content from the television network on the display 30. Alternatively, this second state of the selector 186 may be used when the codec module 100 sends compressed audio signals from the microphone 80 to the set-top box 40 for processing, as discussed below.

In another embodiment of the HVC system 20, the selector 186 can be an audio mixer. As an audio mixer, the selector 186 can receive decoded audio from the set-top box 40 and from decoder 184. In this way, the selector 186 can mix the audio coming from the set-top box 40 with the audio of the videoconference.

In an alternative embodiment, the audio module 180 can send compressed audio to the set-top box 40 on one of its available channels, and the set-top box 40 can process the compressed audio for delivery to the display 30. The delivery can be done through a direct connection between the set-top box 40 and the display 30 or can be routed from the set-top box 40 to the display 30 via the video selector 186.

In one embodiment, the audio selector 186 can be embodied in a physical switch actuated by a user to select routing of video, and the audio selector 186 can be combined with the video selector 186. In an alternative embodiment, the audio selector 166 can be embodied in software of the codec module 100 controlled by user selections and commands from the control module 110, and specifically from its Human User Interface module 120. When either switching or mixing audio, the audio selector 186 preferably performs transitions gradually to make seamless transitions between content audio and video calls.

The video selector 166 can operate in conjunction with the audio selector 186 so that the two can be switched or mixed together when transitioning between content viewing and video calls. Alternatively, the two selectors 166/186 can be separately operable for independent switching and mixing for transitions. In this case, each selector 166/186 can be separately configurable.

The audio module 182 also receives audio from the microphone 80 using conventional interfaces and inputs. Audio compression and decompression can be performed by circuitry associated with the microphone 80, thus allowing acoustic echo cancellation to be performed on captured audio. The encoder 182 encodes the compressed audio and transfers the encoded audio to the television network 12 via network interface module 150 and the modem 50. This transferred audio can then form part of a videoconferencing session with other videoconferencing systems.

The control module 110 includes a human user interface (HUI) module 120, a session control module 130, and a set-top interface module 140. The session control module 130 is configured to establish a videoconferencing session and to control the network interface module 150, video module 160, and audio module 180. The set-top interface module 140 is responsible for interfacing with the set-top box 40. In one embodiment, the set-top interface module 140 controls the audio/video selectors 166 and 186 to select whether audio/video is delivered from the video and audio modules 160 and 180 directly to the display 30 or whether audio/video is delivered from the set-top box 40 to the display 30. In an alternate embodiment where the selectors 166/186 are video/audio mixers (respectively), then the control module 110 can define which source of data or whether the data combined (e.g., mixed) from both sources will be delivered to the display 30.

The human user interface module 120 receives commands or user selections from a control device (not shown), such as a control panel, a remote control, or the like. For example, the control device can be a dedicated remote control for controlling the codec module 100. The commands or user selections are used to setup and initiate videoconference sessions. For example, a user at one home videoconferencing system (e.g., system 20A of FIG. 1) can initiate a videoconference session by entering an address, e.g., Internet Protocol or Session Initiation Protocol address, for another home videoconferencing system (e.g., system 20B of FIG. 1) using a remote control and a menu of the user interface module 120. In turn, the session control module 130 sends a request to the second videoconferencing system.

Upon receiving the request for the incoming videoconference session via the television network 12, the user interface module 120 is configured to process the request and initiate an input call task. The input call task announces the entering of a videoconference call to the user and requests the user to accept or deny the call. The user then uses the control device (e.g., remote control) to communicate user selections to the user interface module 120, which interprets the user selections so that the session control module 130 can control operation of the user codec module 100 and establish the videoconference session.

Optionally or additionally, an exemplary codec module 100 can be adapted to set a connection with the intermediate server 90 for registration at the server 90 as an active endpoint. The registration can be done automatically upon "power on" and/or by a received request/command from the user. In response, the server 90 can send a relevant "buddy list" to the codec module 100 to be displayed on the display 30. For example, displaying the "buddy list" can be done upon receiving a request from the user to see the list. In parallel, the server 90 can update the relevant one or more "buddy lists" at devices of other users that are currently active and that have been defined as the "buddies" of the registered user. The user can select one or more buddies from "buddy list" to participate in a conference.

In an alternate embodiment, the "buddy list" can include the entire address book of the registered user, independently whether those users in the list are active or not. Yet in another embodiment, the "buddy list" can have a field for indicating that the relevant user's codec module 100 is active. Additional techniques for establishing a videoconference can be found in the U.S. Patent Application Publication 2005/0091380, which is incorporated herein by reference in its entirety.

For example, if the user selects to enter the videoconference session, the control module 110 controls the video and audio modules 160 and 180 to process encoded video and audio of the videoconference session received from the network interface module 150. In addition, the control module 110 controls the audio and video selectors 166 and 186 to send decoded video selectively from the modules 160 and 180 to the display 30. Alternatively, the control module 110 can control the codec module 100 to send compressed audio and video signals to the set-top box 40 for processing and can set the selectors 166 and 186 to send video selectively from the set-top box 40 to the display 30.

Figure 3:
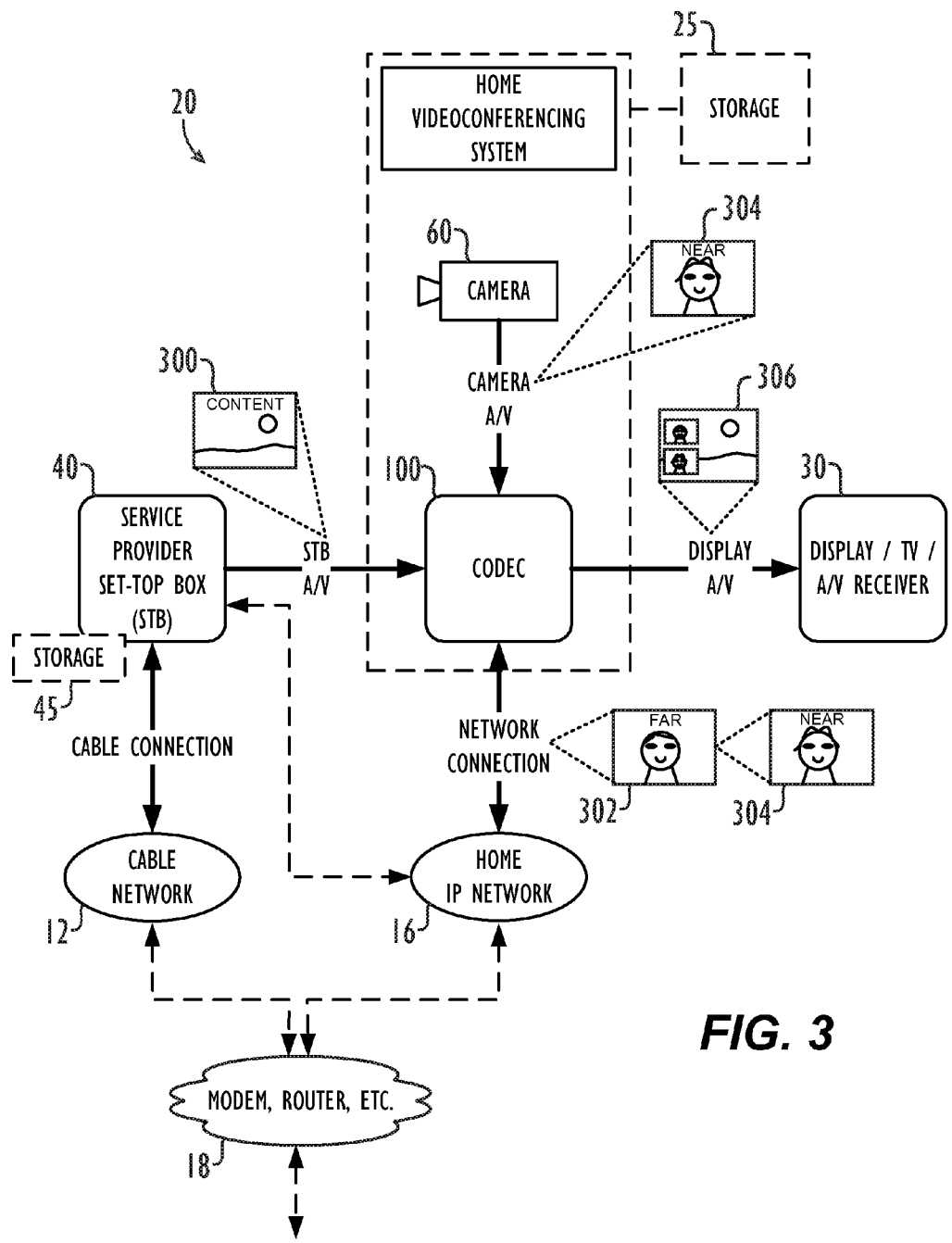
FIG. 3 shows a block diagram of a home videoconferencing system in a typical home audio/video environment.

Another example of the home videoconferencing (HVC) system 20 is shown in FIG. 3 integrated into a home environment. Similar to previous arrangements, the HVC system 20 includes a camera module 60 (which captures images of the local videoconference participants) and a codec or interface module 100 (which encodes the images of the local participants and decodes the images of the remote videoconference participants). The camera module 60 may also include microphones (not shown) for capturing audio of the local participants. Alternatively, microphones can be integrated into the codec module 100 itself, or the microphones can be separate from both the camera and codec modules 60/100 and can be a separate component of the HVC system 20.

The camera module 60 interconnects with the codec module 100 by standard camera video connections (and by audio connections, if necessary) to communicate near-end videoconference content (304) (i.e., video and optionally audio of the near-end). Alternatively, the camera module 60 can be a custom High-Definition Multimedia Interface (HDMI)-attached camera that can utilize a Consumer Electronics Control (CEC) channel for camera control. In this way, the HVC system 20 can control the camera module 60 supported by a single interface (i.e., a single HDMI link).

The codec module 100 connects with both a service provider set-top box 40 and a user's display equipment 30 and can use standard audio/video connections. The display equipment 30 (also generally referred to herein as "display") can include any of the various types of displays, televisions, loudspeakers, audio-visual receivers, and the like.

The interconnections between the codec module 100, the set-top box 40, and the display 30 will be described in more detail later. Briefly, the codec module 100 receives program content 300 (i.e., TV programming) from the set-top box 40. In turn, the codec module 100 outputs selective content to the display 30. As detailed further below, the selected content output to the display 30 can include a videoconference layout 306 during a video call.

Finally, the codec module 100 also connects to a home IP network 16, which provides the module's interconnection to the Internet or other WAN for communication with remote conference participants. Accordingly, the codec module 100 can have an Ethernet connection to the home IP network 16, which can use modems, routers, and the like to connect to the Internet or other WAN. Using this network connection, the codec module 100 can receive far-end videoconference content 302 from far-end endpoints and can send the near-end videoconference content 304.

In some embodiments, the network connection of the videoconferencing system 20 may be through the set-top box 40 and its network connections to the digital television network 12 and/or the Internet as described in previous arrangements. Alternatively, the home IP network 16 may have a separate Internet or WAN connection into the home that is independent of the cable network 12. Moreover, the home environment may have a modem, router, or the like 18 (e.g., a cable/DSL router) having an outside network connection into the home that branches out to the cable network 12 for the various set-top boxes 40 and displays 30 and to the home IP network 16 for the various computers, videoconferencing systems 20, and the like.

Regardless of the network connections, the topology shown in FIG. 3 has the HVC system 20 serving as an intermediary between the content source (set-top box 40) and the display 30. This arrangement can have many advantages that improve the user's experience, as explained in greater detail below.

Figure 4:
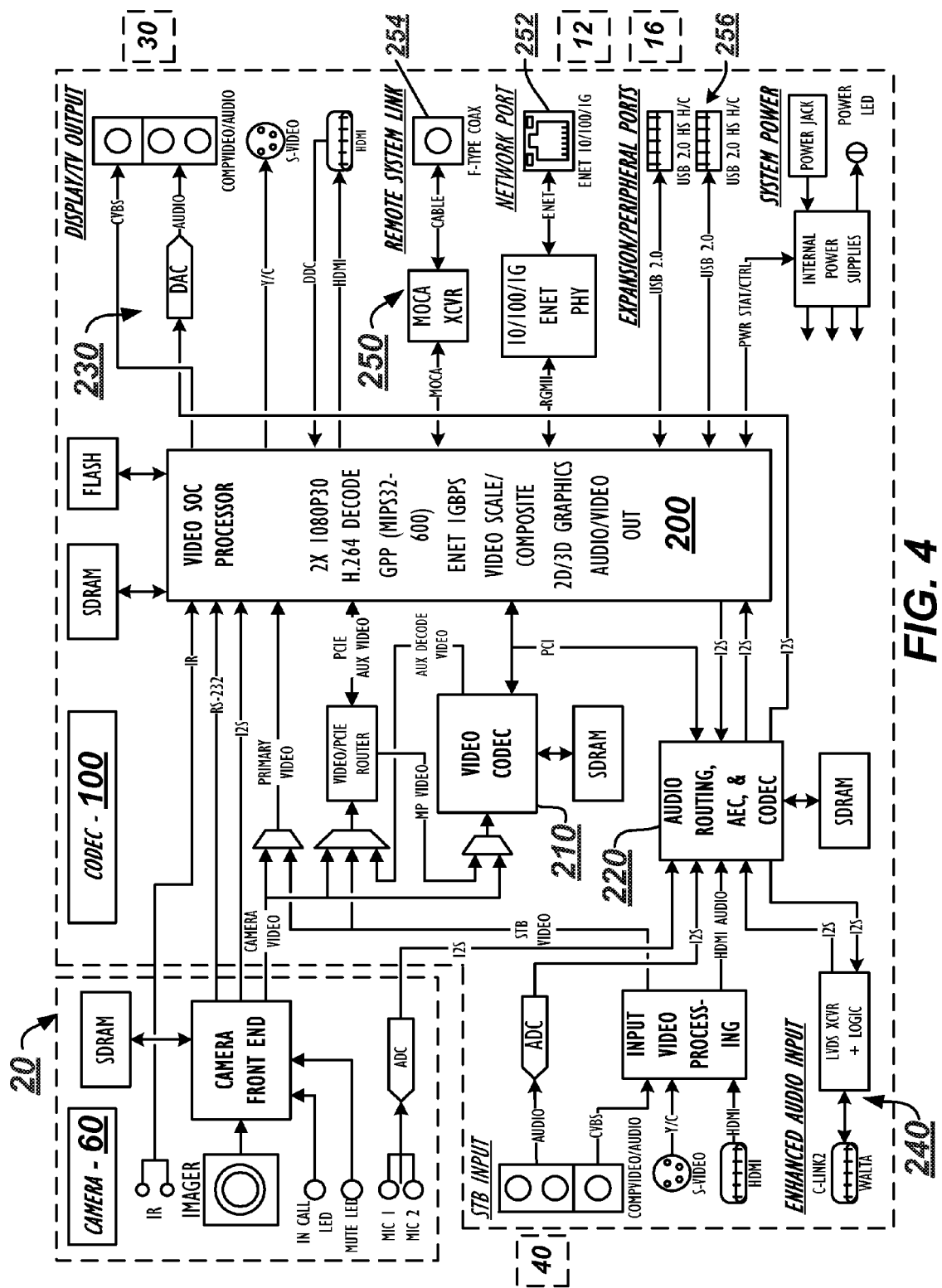
FIG. 4 shows a schematic diagram of an exemplary home videoconferencing system of the present disclosure.

FIG. 4 shows a more detailed block diagram of the HVC system 20, which can serve as the intermediary. Again, the system's two main components include the camera module 60 and the codec module 100, which may or may not be integrated together in a single unit. As can be seen, the camera module 60 includes an imager 62 that captures images of local participants during a videoconference. The camera module 60 also includes a camera front end 64 that performs pre-processing on the captured images and communicates with the codec module 100. The communication with the codec module 100 can take the form of various links, including an RS-232 serial link, an I2S (inter-integrated circuit sound) or I2C (inter-integrated circuit) bus, and a video connection. For its part, the video connection can be provided over RCA cables, co-axial cables, HDMI cables, USB, or a variety of other interfaces.

The camera module 60 can also include IR receivers 66 for receiving commands from a remote control unit (not shown). These IR signals can be passed directly to the codec module 100 without pre-processing. The camera module 60 can also include status LEDs 68 to provide user indication of the current operating state of the HVC system 20. For example, a green LED 68 can indicate that the system 20 is currently in a call, while a red LED 68 can indicate that the audio is muted.

Finally, the camera module 60 can contain one or more microphones 80 and, optionally, one or more analog-to-digital converters (ADCs) 82 connected thereto. Captured audio signals can be communicated to the codec module 100 over another communications link, which can be an I2S or other type link.

As hinted to above, the codec module 100 serves as a central media distribution point because the codec module 100 operates as the videoconferencing system, connects to all the other A/V components, and connects the incoming sources (whether TV programming or videoconferencing) to the user's audio/video display equipment 30. To that end, the codec module 100 includes one or more input interfaces 240 for receiving input from the set-top box 40 or other content source and includes output interfaces 230 for outputting content to the display equipment 30. In addition, the codec module 100 interfaces with the camera module 60 (as described previously) and has network/communication interfaces 250 for connecting to networks and/or one or more peripheral devices.

At the heart of the codec module 100 is a main processor 200, which can be a video system-on-a-chip (SoC), such as a MIPS32-600 processor. Such a video SoC processor is typically based on a microprocessor enhanced with one or more audio and video encoders and/or decoders, application specific registers and/or instructions, and integrated interfaces for receiving and sending audio and video signals.

The input interfaces 240 for receiving signals from the set top box (40) can receive video signals in various formats such as Composite video, S-Video, HDMI, etc. Audio signals may be received in either analog or digital form. In some embodiments, the audio signals may be passed directly through the codec module 100 to its output interface 230 and to the user's display 30. In other embodiments, these audio signals may undergo some level of processing and/or switching by the video SoC processor 200 or other components as appropriate, including ADCs, video processors, audio processors, etc.

The input received from the HVC system's camera module 60 may be similarly processed and/or routed, either by the video SoC processor 200 or by other components. For example, a dedicated video codec 210 can be used with the videoconferencing functionality of the codec module 100. Such a dedicated video codec 210 may be useful because videoconferencing may use video encoding standards not typically used for other forms of media distribution. In particular, the encoding standards for videoconferencing may use H.261 or H.263, but distributed media such as digital television may typically use MPEG-2, MPEG-4, or H.264 (AVC) video encoding. In this way, the dedicated video codec 210 can handle the different video encoding as needed. A similar rationale exists for including a separate audio codec 220, which can handle the different forms of audio encoding involved. In fact, an integrated device can incorporate the video SoC processor 200, the video codec 210, and/or the audio codec 220, as well as any other features of the codec module 100.

Whether using the video SoC processor 200, the separate audio and video codecs 210 and 220, or some combination thereof, the codec module 100 itself serves as the "brains" of the videoconferencing functionality. Accordingly, the video SoC processor 200 encodes and sends the audio and video of the near-end participants over the network interface (16). Similarly, codec module 100 receives via the network interface (16) audio and video conferencing signals from one or more remote users at the far-end. These signals are decoded (again via the video SoC processor 200, dedicated conferencing codecs 210/220, or some combination thereof) and output for display on the user's display 30.

Acting in this manner, the video SoC processor 200 incorporates the features of the audio and video selectors (166/186; FIG. 2) as described in previous arrangements for switching or mixing audio and video between content viewing (i.e., TV programming) and video calls. These selector functions can be embodied in software of the codec module 100 and can be controlled automatically and/or by user selections and commands from a Human User Interface module (120; FIG. 2).

The video and audio selection can operate in conjunction with one another so that the audio and video can be switched or mixed together when transitioning between content viewing and video calls. Alternatively, the video and audio selection can be separately operable for independent switching and mixing of transitions between content viewing and video calls. In this case, each selection can be separately configurable. Yet, the codec module 100 preferably employs automated A/V synchronization features to control the timing of audio and video delivery to the display 30 to optimize the user's experience.

The output interfaces 230 for connection to the user's display 30 can generally be symmetric to the NV input interfaces 240 for the set-top box 40. Thus, the interfaces 230 can include various video interfaces, including Composite, S-Video, and HDMI. Similarly, audio can be communicated in analog form via digital-to-analog converters (DACs) and RCA-style connectors, or the audio can be communicated in digital form via either HDMI or a Toslink optical digital interface (not shown).

As mentioned previously, various network/communication interfaces 250 can also be provided as necessary. For example, one network interface 250 of the codec module 100 can include an Ethernet interface 252 for connection to the home IP network (16; FIG. 2) that provides the interconnection to the Internet or other WAN for communication with remote conference participants. Again, this Ethernet interface 252 to the home IP network (16) can use modems, routers, and the like to connect to the Internet or other WAN for communication In addition to the Ethernet interface 252, the interfaces 250 can include a MoCA (multimedia over co-axial cable) interface 254 for connection with other devices. For example, the MoCA interface 254 and interconnect can be utilized to support a second/remote monitor for the HVC system 20, or to link multiple HVC systems 20 within a home.

In addition, the interfaces 250 can include USB interfaces 256 for expansion or peripherals. Using expansion or peripheral ports via USB (or eSATA, if required), for example, the HVC system 20 as shown in FIG. 3 can support additional storage 25 to enable local call recording, local video mail capability, TV program recording, and the like. In a related arrangement, the HVC system 20 can support access to SD cards or similar media (through a USB port) to support sharing of electronic photos and/or video clips in a call. Overall, the HVC system 20 can use remote system links, such as Coax or network ports, and can support remote access to in-home audio and video for monitoring. More sophisticated surveillance features are also possible.

The following description includes various functional parameters of the components of the HVC system 20 of FIGS. 3-4. The camera module 60 can provide image capture at HD resolution (720 p 30 frames/sec minimum) and audio pickup using a beam-forming arrangement of microphones 80. The camera module 60 can be implemented as a separate physical module to facilitate optimum placement (typically at the top center of the display 30). Because the camera module 60 can contain the HVC system's IR detectors 66 and LEDs 68 to receive commands and indicate basic system status to the user, the codec module 100 can be placed in a console or other unobtrusive location.

The set-top box's input interfaces 240 can provide a set of standard interfaces for receiving audio and video from the set-top box 40, including, but not limited to, Composite, S-Video, and HDMI 1.3 interfaces. High quality input video processing can be provided to avoid degradation of the set-top box's audio and video when the HVC system 20 is in "pass-through" mode (i.e., when the codec module 100 is simply routing the set-top box's audio and video through to the display 30 for content viewing).

The codec module 100 and associated video routing structures can support simultaneous processing of dual video streams so that both set-top box video and videoconferencing streams (far or near camera) can be displayed at the same time. This capability also facilitates seamless transitions between content viewing and video calls as described in more detail later.

The codec module 100 itself can support H.264 Baseline Profile (optionally including Main Profile) video encode capability up to 1080 p 30 frames/sec and H.263/H.261 video encode capability up to CIF/SIF (common intermediate format). The codec module 100 and routing structures coupled with the multiple decode and video compositing capabilities of the video SoC processor 200 can support multipoint video call configurations. Moreover, video routing structures upstream from the codec module 100 can supply the input of the codec module 100 with either local (near-end) camera video or preprocessed (composited) streams, with the latter case used to support multipoint call scenarios.

The codec module 100 can provide legacy (H.263/H.261) interoperability, which is not necessarily inherent in the Video SoC processor 200 alone. This capability supports connectivity to the large base of existing enterprise videoconferencing units, facilitating home office applications. For interoperability with legacy videoconferencing systems, for example, the codec module 100 can decode H.263/H.261 streams at up to CIF/SIF resolution. The codec's video routing structures can then supply this decoded video stream to the video SoC processor 200 for compositing and display.

The audio codec 220 can include Audio Routing, AEC and Audio Codec subsystems that can implement audio room processing, including acoustic echo cancellation (AEC) and audio codecs. Advanced audio processing capabilities, including echo cancellation technology such as that marketed by Polycom, Inc. can provide the acoustic echo cancellation (AEC) capability and can support the use of an optional external digital microphone array for optimum audio performance.

Over all, the audio codec 220 can support flexible routing of audio streams from the set-top box 40, local microphones 80, and audio decoder to the audio encoder and the local speakers of display 30. Pass-through of high-quality audio streams from the set-top box 40 to the display 30 can be supported at up to 8 audio channels.

The video SoC processor 200 can use a cost-effective integrated circuit device designed for the consumer set-top box market to provide dual H.264 video decoding up to 1080 p 30 frames/sec per channel, general-purpose computing for system control and data handling, Ethernet interfacing for network communications, video datapath functioning such as scaling and compositing to facilitate seamless content/call transitions and optimize the user experience in both content and call modes, 2D/3D graphics generation for a high-quality user interface implementation, video and audio output driving for interfacing to the display 30, USB ports for expansion capability (including optional external wireless Ethernet and data storage modules), and a Multimedia over Coax Alliance (MoCA) interface for driving compressed data to a secondary monitor and/or interfacing to other remote HVC systems 20 in the home. Overall, the video datapath design can support the dual-stream, multipoint and legacy interoperability features through use of non-video buses and interfaces on the video SoC processor 200.

Given these features, the HVC system 20 can support simultaneous processing of AV streams from both the set-top box 40 and the videoconferencing subsystem (audio and video codecs 210 and 220) for enhanced user experience. This simultaneous processing can be used to provide graceful transitions between content viewing and video calls as well as supporting a Picture-in-Picture (PIP) view of the TV feed within a video call (or vice versa). Examples of such transitioning are discussed below with reference to arrangements of the HVC system 20 provided in FIGS. 5-6.

Figure 5:
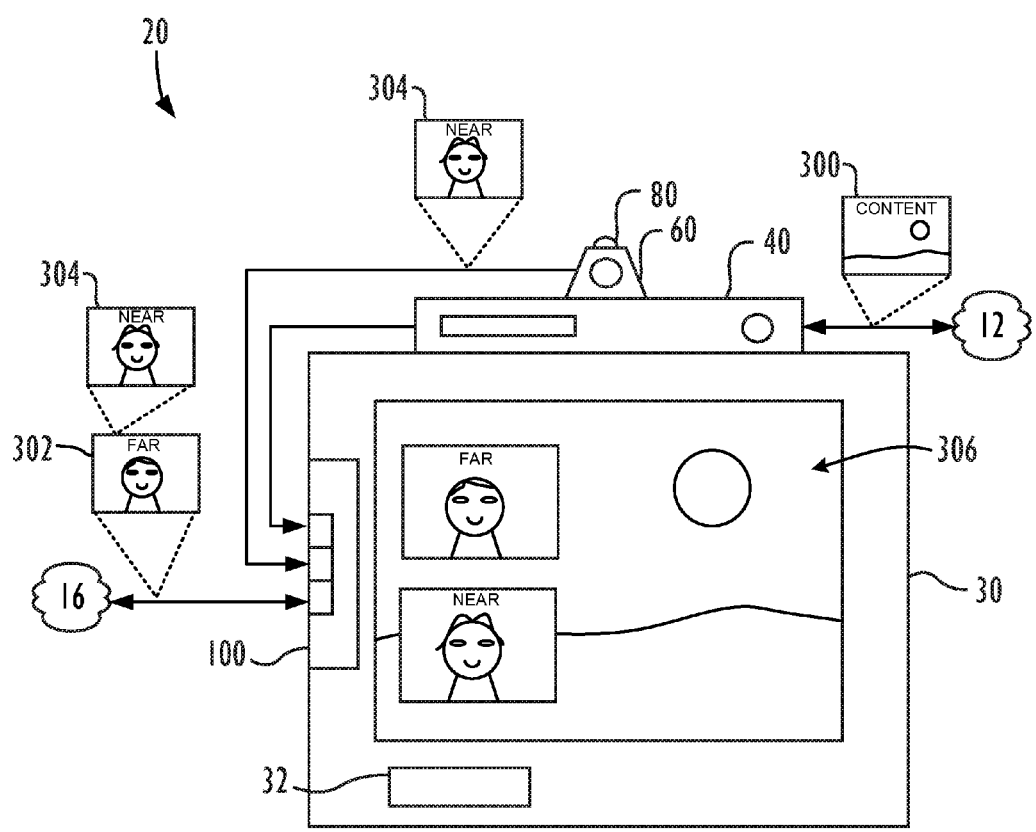
FIG. 5 shows one arrangement of a codec module, a display, a set-top box, and a camera for a home videoconferencing system of the present disclosure.

One arrangement of the codec module 100, the display 30, the set-top box 40, and the camera module 60 for the HVC system 20 is illustrated in FIG. 5. Rather than being a stand-alone unit, the codec module 100 in this arrangement is incorporated into the display 30, which can be a television or the like. Although not shown, the codec module 100 can alternatively be incorporated into the set-top box 40 or all of the components (30, 40, and 100) can be integrated into a unitary device.

In fact, the display 30 can be an Internet-enabled television similar to Internet-enabled High-Definition (HD) televisions available from Samsung and Panasonic. As such, the display 30 can have an integrated USB port for connection to a computer webcam or to a specific TV-based webcam. Additionally, the Internet-enabled display 30 can have an integrated LAN port for an Ethernet connection for Internet content. Internally, such an Internet-enable display 30 can have computer circuitry and software for downloading and streaming Internet content for display even while program content is being shown. Because the codec module 100 is incorporated into such an Internet-enabled display 30, components of the codec module 100 (e.g., video SoC processor 200, video codec 210, audio codec 220, and Ethernet interface 252 of FIG. 4) can be combined with or connected to the display's internal circuitry and some of the manual interfaces, such as output video interfaces 230, of the module 100 may be eliminated.

In any event, the set-top box 40 in the arrangement of FIG. 5 connects between the cable network 12 and the codec module 100. The cable network 12 provides the television/cable program content. The camera module 60 in this arrangement is a stand-alone device, although it can be integrated into any of the other devices. Having built-in microphones 80, the camera module 60 connects to the codec module 100 to provide local videoconference content (audio and video of the near-end). For its part, the codec module 100 interfaces with the display 30 to which it is incorporated and connects to one or more networks, such as the IP network 16 and/or the cable network 12, as described herein.

As noted above, the HVC system 20 can support simultaneous processing of AV streams from both the set-top box 40 and the videoconferencing subsystem (e.g., audio and video codecs 210 and 220 of FIG. 4) for enhanced user experience, providing graceful transitions between content viewing and videoconferencing mode as well as supporting a PIP view of the TV program feed within a video call (or vice versa). An exemplary use of such a graceful transition mode is as follows.

Suppose a user is watching a television program on his display 30 when an incoming videoconference call is received. On the display 30, the user may be presented with an overlay (not shown) on the program content 300 (i.e., television video), where the overlay provides the user with the option to answer or ignore the call using a remote control or the like. In general, the HVC system 20 can employ a simplified and streamlined UI compared to standard enterprise-grade videoconferencing systems. Alternatively, the system 20 can be configured to automatically answer the video call.

In either case, when the video call is answered, the program content 300 and videoconference video can be switched or combined with one another by the codec module 100 for the display 30 using its processing capabilities. For example, the program content 300 can be minimized to a Picture-in-Picture (PIP) window and can be left on-screen in the videoconference layout 306 for the display 30 during the video call. Alternatively, the program content 300 can remain on the display 30 and the far-end videoconference content 302 (and optionally the near-end content 304) can be displayed as PIP windows in the videoconference layout 306 for the display 30. In another option, the far-end videoconference content 302 can be displayed on-screen with the near-end videoconference content 304 displayed as a PIP window while the program content 300 is not shown in the layout 306. These and other formats can be used as desired for the layout 306 of the program content 300 and videoconferencing content (302 and optionally 304), and the HVC system 20 can support automated video layout configuration based on autodetection of the number and resolution of attached displays 30.

For audio, the codec module 100 can switch the audio during the video call from the television audio to the videoconference audio from the far-end for output on local loudspeakers 32. In the end, the near-end videoconference content 304 can be sent by the codec module 100 to remote endpoints via the networks 12 and/or 16.

Whether the program content 300 is being displayed or not on the display 30 during the video call, the codec module 100 can instruct the set-top box 40 to begin recording the program content so that the user may return to the present point in the television program once the video call is completed. To do this, the codec module 100 can send the instruction via an A/V interface, such as HDMI-CEC channel between the codec module 100 and the set-top box 40, which can have its own storage (i.e., storage 45 in FIG. 3). Alternatively, the codec module 100 can perform the recording function itself using internal or external memory connected thereto as described herein (i.e., storage 25 in FIG. 3).

Figure 6:
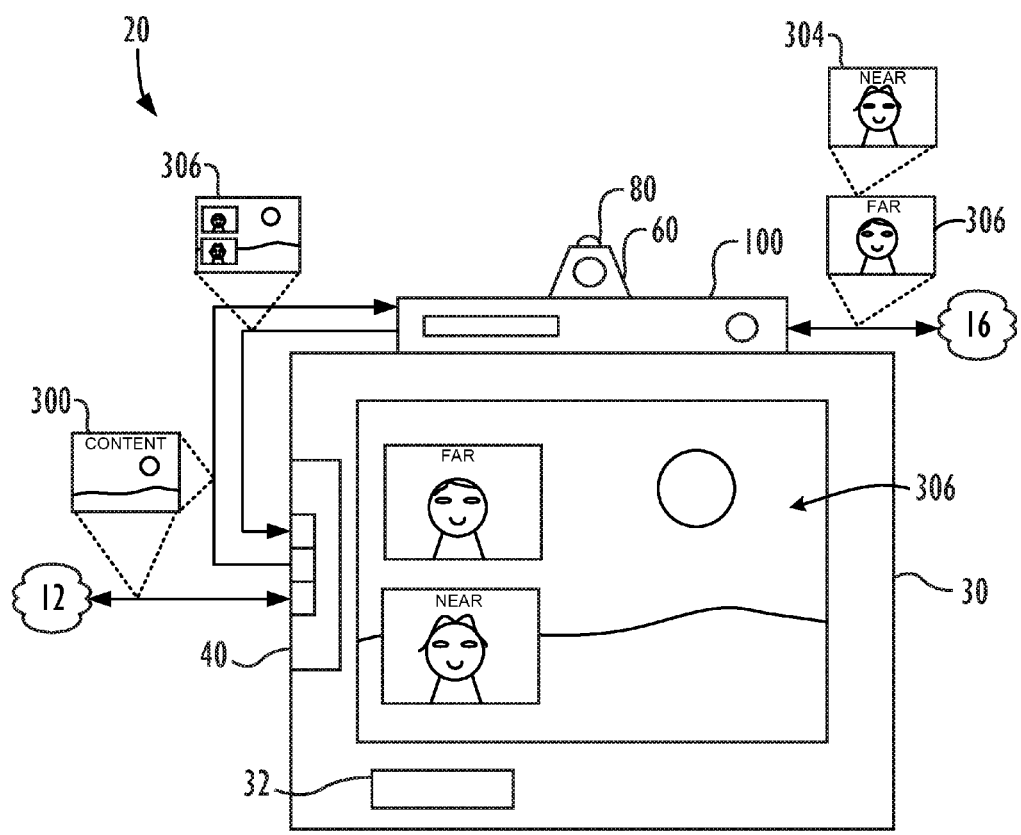
FIG. 6 shows another arrangement of a codec module, a display, a set-top box, and a camera for a home videoconferencing system of the present disclosure.

FIG. 6 shows another arrangement of the codec module 100, the display 30, the set-top box 40, and the camera module 60 for the HVC system 20. The codec module 100 in this arrangement is a stand-alone unit, while the features of the set-top box 40 are incorporated into the display 30, which can be a television or the like. In other words, the display 30 can have the features of a set-top box integrated therewith that convert a particular signal into content for display. Thus, the set-top box component 40 of the display 30 receives the program content 300, which is output to the codec module 100 rather than or in addition to being output for the display 30. Receiving near-end videoconference content 304 from the camera module 60 and microphone 80, the codec module 100 composites a videoconference layout 306 using the far-end videoconference content 302 received from the network 12 and/or 16. The codec module 100 sends this videoconference layout 306 to the display 30 and sends the near-end videoconference content 304 to remote endpoints via the network 12 and/or 16.

Aspects of the present disclosure are described as a method of control or manipulation of data, and may be implemented in one or a combination of hardware, firmware, and software. Disclosed embodiments may also be implemented as instructions stored on a machine-readable medium or program storage device, which may be read and executed by a programmable control device or at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. In addition, although certain combinations may not be expressly set forth, one skilled in the art will recognize with the benefit of the present disclosure that features of one embodiment disclosed herein may be combined with features of another disclosed embodiment. For example, the HVC system 20 as disclosed in FIGS. 3-5 can include features as shown and discussed with reference to the embodiment of the FIG. 2 and vice versa.

Various changes in the details of the illustrated operational methods are possible without departing from the scope of the following claims. Alternatively, some embodiments may combine the activities described herein as being separate steps. Similarly, one or more of the described steps may be omitted, depending upon the specific operational environment the method is being implemented in. Acts in accordance with the present disclosure may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A home videoconferencing apparatus, comprising:
a plurality interfaces for communicating content; and
one or more processors operatively coupled to the interfaces, the one or more processors operable to:
selectively output program content to a display component via at least one of the interfaces, the program content received from one or more networks via at least one of the interfaces,
selectively output far-end videoconference content to the display component during a video call, the far-end videoconference content received from the one or more networks during the video call via at least one of the interfaces,
selectively output near-end videoconference content over the one or more networks during the video call via at least one of the interfaces, and
selectively send uncompressed video signals to the display component via at least one of the interfaces, the uncompressed video signals including video signals received via a first of the one or more networks in a first selected mode, via a second of the one or more networks in a second selected mode, and via both the first and second networks in a third selected mode.

2. The apparatus of claim 1, wherein the apparatus comprises at least one of the display component, a set-top box component, a camera component, and a microphone component integrated therewith.

3. The apparatus of claim 1, wherein the one or more processors receive the program content from a set-top box component via the at least one of the interfaces.

4. The apparatus of claim 3, wherein the one or more processors send an instruction to the set-top box component to store the program content in memory during the video call.

5. The apparatus of claim 1, further comprising a memory component for storing content, wherein the one or more processors are operable to store the program content in the memory component while selectively outputting at least the far-end videoconference content to the display component.

6. The apparatus of claim 1, further comprising a memory component for storing content, wherein the one or more processors are operable to store the far-end videoconference content in the memory component while selectively outputting at least the program content to the display component.

7. The apparatus of claim 1, wherein the interfaces comprise a camera interface coupling to a camera component and receiving the near-end videoconference content.

8. The apparatus of claim 7, wherein the one or more processors are operable to control the camera component via the camera interface.

9. The apparatus of claim 1, wherein the interfaces comprise a set-top box interface coupling to a set-top box component and receiving the program content.

10. The apparatus of claim 1, wherein the interfaces comprise a display interface coupling to the display component and outputting the content to the display component.

11. The apparatus of claim 1, wherein the interfaces comprise one or more network interfaces coupling to the one or more networks and communicating the content over the one or more networks.

12. The apparatus of claim 1, comprising a camera component outputting video as a part of the near-end videoconference content.

13. The apparatus of claim 12, comprising a microphone component outputting audio as a part of the near-end videoconference content.

14. The apparatus of claim 1, wherein the one or more processors are operable to selectively output the program content in combination with the far-end videoconference content to the display component during the video call.

15. The apparatus of claim 14, wherein to selectively output the program content in combination with the far-end videoconference content, the one or more processors are operable to composite at least one of the program content and the far-end videoconference content as a picture-in-picture window of the other content.

16. The apparatus of claim 1, wherein the one or more processors are operable to selectively output the near-end videoconference content in combination with the far-end videoconference content to the display component during the video call.

17. The apparatus of claim 16, wherein to selectively output the near-end videoconference content in combination with the far-end videoconference content, the one or more processors are operable to composite at least one of the near-end videoconference content and the far-end videoconference content as a picture-in-picture window of the other content.

18. The apparatus of claim 1, wherein the one or more processors comprise a video-system-on-a-chip processor operatively coupled to one or more of the interfaces.

19. The apparatus of claim 1, wherein the one or more processors comprise a video codec operatively coupled to one or more of the interfaces and processing the near-end videoconference conent, the far-end videoconference content, the program content, or a combination thereof.

20. The apparatus of claim 1, wherein the one or more processors comprise an audio codec operatively coupled to one or more of the interfaces and processing the near-end videoconference conent, the far-end videoconference content, the program content, or a combination thereof.

21. The apparatus of claim 1, wherein at least one of the networks comprises at least one of a cable television network and an Internet Protocol network.

22. A home videoconferencing method, comprising:
receiving program content from one or more networks via at least one of a plurality of interface;
selectively outputting the program content to a display component for display via at least one of the interfaces;
participating in a video call via one or more networks;

receiving far-end videoconference content from the one or more networks during the video call via at least one of the interfaces;

receiving near-end videoconference content during the video call;

selectively outputting the far-end videoconference content to the display component for display during the video call;

selectively outputting the near-end videoconference content over the one or more networks during the video call; and selectively sending uncompressed video signals to the display component via at least one of the interfaces, the uncompressed video signals including video signals received via a first of the one or more networks in a first selected mode, via a second of the one or more networks in a second selected mode, and via both the first and second networks in a third selected mode.

23. A programmable storage device having program instructions stored thereon for causing a programmable control device to perform a home videoconferencing method, the method comprising:

receiving program content from one or more networks via at least one of a plurality of interface;

selectively outputting the program content to a display component for display via at least one of the interfaces;

participating in a video call via the one or more networks;

receiving far-end videoconference content from the one or more networks during the video call via at least one of the interfaces;

receiving near-end videoconference content during the video call;

selectively outputting the far-end videoconference content to the display component for display during the video call;

selectively outputting the near-end videoconference content over the one or more networks during the video call; and selectively sending uncompressed video signals to the display component via at least one of the interfaces, the uncompressed video signals including video signals received via a first of the one or more networks in a first selected mode, via a second of the one or more networks in a second selected mode, and via both the first and second networks in a third selected mode.

24. The method of claim 22, wherein receiving the program content comprises receiving the program content from a set-top box component via the at least one of the interfaces.

25. The method of claim 24, further comprising sending an instruction to the set-top box component to store the program content in memory during the video call.

26. The method of claim 22, further comprising storing the program content in memory while selectively outputting at least the far-end videoconference content to the display component.

27. The method of claim 22, further comprising storing the far-end videoconference content in memory while selectively outputting at least the program content to the display component.

28. The method of claim 22, wherein to selectively output the program content and the far-end videoconference content, the method comprises selectively outputting the program content in combination with the far-end videoconference content to the display component during the video call.

29. The method of claim 28, wherein to selectively output the program content in combination with the far-end videoconference content, the method comprises compositing at least one of the program content and the far-end videoconference content as a picture-in-picture window of the other content.

30. The method of claim 22, wherein to selectively output the program content and the far-end videoconference content, the method comprises selectively outputting the near-end videoconference content in combination with the far-end videoconference content to the display component during the video call.

31. The method of claim 30, wherein to selectively output the near-end videoconference content in combination with the far-end videoconference content, the method comprises compositing at least one of the near-end videoconference content and the far-end videoconference content as a picture-in-picture window of the other content.

32. The programmable storage device of claim 23, wherein receiving the program content comprises receiving the program content from a set-top box component via the at least one of the interfaces.

33. The programmable storage device of claim 32, further comprising sending an instruction to the set-top box component to store the program content in memory during the video call.

34. The programmable storage device of claim 23, further comprising storing the program content in memory while selectively outputting at least the far-end videoconference content to the display component.

35. The programmable storage device of claim 23, further comprising storing the far-end videoconference content in memory while selectively outputting at least the program content to the display component.

36. The programmable storage device of claim 23, wherein to selectively output the program content and the far-end videoconference content, the method comprises selectively outputting the program content in combination with the far-end videoconference content to the display component during the video call.

37. The programmable storage device of claim 36, wherein to selectively output the program content in combination with the far-end videoconference content, the method comprises compositing at least one of the program content and the far-end videoconference content as a picture-in-picture window of the other content.

38. The programmable storage device of claim 23, wherein to selectively output the program content and the far-end videoconference content, the method comprises selectively outputting the near-end videoconference content in combination with the far-end videoconference content to the display component during the video call.

39. The programmable storage device of claim 38, wherein to selectively output the near-end videoconference content in combination with the far-end videoconference content, the method comprises compositing at least one of the near-end videoconference content and the far-end videoconference content as a picture-in-picture window of the other content.

* * * * *